US012631157B2

(12) United States Patent
Zeni et al.

(10) Patent No.: US 12,631,157 B2
(45) Date of Patent: May 19, 2026

(54) SYSTEM AND METHOD FOR RECOVERY OF REDUNDANT GASEOUS FUEL FROM A GASEOUS FUEL SUPPLY SYSTEM

(71) Applicant: Volvo Truck Corporation, Gothenburg (SE)

(72) Inventors: Cristiano Zeni, Lyons (FR); Rafig Babayev, Gothenburg (SE); Tankai Zhang, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 3 days.

(21) Appl. No.: 18/965,253

(22) Filed: Dec. 2, 2024

(65) Prior Publication Data

US 2025/0198371 A1 Jun. 19, 2025

(30) Foreign Application Priority Data

Dec. 13, 2023 (EP) .................................... 23216339

(51) Int. Cl.
*F02M 21/02* (2006.01)
*F02B 43/12* (2006.01)

(52) U.S. Cl.
CPC ......... *F02M 21/0293* (2013.01); *F02B 43/12* (2013.01); *F02M 21/0206* (2013.01)

(58) Field of Classification Search
CPC .... B60K 15/03006; B60K 2015/03013; B60K 2015/03315; F02D 19/0644;
(Continued)

(56) References Cited

U.S. PATENT DOCUMENTS 5,092,281 A 3/1992 Iwaki et al.
5,375,580 A 12/1994 Stolz et al.
(Continued)

FOREIGN PATENT DOCUMENTS

CN 106915235 A 7/2017
CN 107687379 A * 2/2018 ......... F02M 21/0212
(Continued)

OTHER PUBLICATIONS

Certification of Correction for U.S. Pat. No. 5,092,281, dated Mar. 3, 1992.
(Continued)

*Primary Examiner* — George C Jin
*Assistant Examiner* — Teuta B Holbrook
(74) *Attorney, Agent, or Firm* — Withrow & Terranova, PLLC

(57) ABSTRACT

A gaseous fuel supply system for a clean combustion engine having a fuel injector, the supply system comprising: a first gaseous fuel tank arrangement comprising at least a first gaseous fuel tank storing pressurized gaseous fuel; a fuel rail arranged to supply gaseous fuel to the fuel injector; a first supply line arranged to supply pressurized gaseous fuel from the first gaseous fuel tank arrangement to the fuel rail; at least one return line arranged to transport redundant gaseous fuel from at least one of the fuel rail and the clean combustion engine; and a control unit configured to: in response to a reduced demand in injection pressure of the gaseous fuel to the clean combustion engine, control transport of redundant gaseous fuel away from the fuel rail and/or the clean combustion engine via the return line.

12 Claims, 3 Drawing Sheets

(58) Field of Classification Search

CPC ............ F02D 19/0684; F02D 19/0694; F02M 21/0218; F02M 21/0221; F02M 21/0224; F02M 21/023; F02M 21/0245; F02M 21/0248; F02M 21/0293; F17C 2221/033; F17C 2223/0161; F17C 2265/037

See application file for complete search history.

(56) References Cited

U.S. PATENT DOCUMENTS

| | | | | |
|---|---|---|---|---|
| 5,868,122 | A | 2/1999 | Gram et al. | |
| 7,367,312 | B1 | 5/2008 | Boyer et al. | |
| 9,995,258 | B2 | 6/2018 | Takeuchi et al. | |
| 11,639,691 | B2 | 5/2023 | Puran et al. | |
| 2008/0099002 | A1 * | 5/2008 | Boyer | F02D 19/022 123/527 |
| 2009/0114367 | A1 | 5/2009 | Handa | |
| 2014/0116375 | A1 | 5/2014 | Kim et al. | |
| 2014/0209070 | A1 | 7/2014 | Gleeson et al. | |
| 2021/0131382 | A1 | 5/2021 | Manfrida et al. | |
| 2021/0301775 | A1 | 9/2021 | Puran et al. | |
| 2021/0372350 | A1 * | 12/2021 | Seba | F02M 21/0218 |
| 2022/0260040 | A1 | 8/2022 | Malischewski et al. | |
| 2025/0297587 | A1 | 9/2025 | Matsuda | |

FOREIGN PATENT DOCUMENTS

| | | | | | |
|---|---|---|---|---|---|
| CN | 111336047 | A | * | 6/2020 | F02M 43/00 |
| CN | 114183276 | A | | 3/2022 | |
| CN | 116344866 | A | | 6/2023 | |
| DE | 102010053498 | A1 | | 6/2012 | |
| DE | 102016220851 | A1 | | 4/2018 | |
| DE | 102018215847 | A1 | | 3/2020 | |
| DE | 102021131038 | A1 | * | 6/2023 | F02D 19/027 |
| EP | 3168445 | A1 | | 5/2017 | |
| EP | 3578793 | B1 | | 12/2019 | |
| EP | 3578794 | A1 | | 12/2019 | |
| EP | 3885640 | A2 | * | 9/2021 | F02M 21/0245 |
| EP | 3915820 | A1 | | 12/2021 | |
| EP | 3885640 | A3 | | 1/2022 | |
| EP | 4245975 | A1 | | 9/2023 | |
| JP | 2017166424 | A | | 9/2017 | |
| JP | 2020094526 | A | | 6/2020 | |
| KR | 20190090679 | A | | 8/2019 | |
| KR | 20200042278 | A | | 4/2020 | |
| KR | 102213227 | B1 | * | 2/2021 | F02D 19/027 |
| KR | 20220051100 | A | * | 4/2022 | B63H 21/38 |
| WO | 2016115603 | A1 | | 7/2016 | |
| WO | 2022266769 | A1 | | 12/2022 | |

OTHER PUBLICATIONS

Extended European Search Report for European Patent Application No. 23216341.0, mailed May 21, 2024, 5 pages.

Extended European Search Report for European Patent Application No. 23216339.4, mailed May 21, 2024, 7 pages.

Extended European Search Report for European Patent Application No. 23216338.6, mailed May 2, 2024, 6 pages.

Extended European Search Report for European Patent Application No. 23216343.6, mailed May 21, 2024, 7 pages.

* cited by examiner

SYSTEM AND METHOD FOR RECOVERY OF REDUNDANT GASEOUS FUEL FROM A GASEOUS FUEL SUPPLY SYSTEM

PRIORITY APPLICATIONS

The present application claims priority to European Patent Application No. 23216339.4, filed on Dec. 13, 2023, and entitled "SYSTEM AND METHOD FOR RECOVERY OF REDUNDANT GASEOUS FUEL FROM A GASEOUS FUEL SUPPLY SYSTEM," which is incorporated herein by reference in its entirety.

TECHNICAL FIELD

The disclosure relates generally to gaseous fuel supply systems for a clean combustion engine. In particular aspects, the disclosure relates to a system and method for recovery of redundant gaseous fuel from a gaseous fuel supply system of a clean combustion engine. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that are important aspects when choosing vehicle engine. Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is natural that also the costs of engine components are reduced.

In order to meet the demands, various engine concepts have been developed throughout the years where conventional combustion cylinders have been combined with e.g. a pre-compression stage and/or an expansion stage. Other engine concepts relates to the fuel used and combusted in the combustion engine. For example, gasoline and diesel can be exchanged to more environmentally friendly fuels, e.g. biofuels such as e.g. ethanol. In some cases, when exchanging the fuel, the combustion engine needs to be adapted to optimally operate on the new fuel. Lately, clean combustion engines, such as e.g. near zero emission combustion engines have become increasingly interesting. For example, by changing the fuel to hydrogen, or a hydrogen based fuel, the combustion of hydrogen with oxygen produces only water as biproduct (theoretically).

Clean combustion engines typically require an efficient and reliable fuel supply, and a pressure and temperature regulation of the supplied gaseous fuel. However, during transient operation conditions of the clean combustion engine, unburnt gaseous fuel may be remained in the engine or fuel rail. There is thus a need in the industry for an improved system.

SUMMARY

According to a first aspect of the disclosure, a gaseous fuel supply system for a clean combustion engine having a fuel injector is provided. The gaseous fuel supply system comprises: a first gaseous fuel tank arrangement comprising at least a first gaseous fuel tank storing pressurized gaseous fuel; a fuel rail arranged to supply gaseous fuel to the fuel injector; a first supply line arranged to supply pressurized gaseous fuel from the first gaseous fuel tank arrangement to the fuel rail; at least one return line arranged to transport redundant gaseous fuel from at least one of the fuel rail and the clean combustion engine; and a control unit configured to: in response to a reduced demand in injection pressure of the gaseous fuel to the clean combustion engine, control transport of redundant gaseous fuel away from the fuel rail and/or the clean combustion engine via the return line. The first aspect of the disclosure may seek to solve problems with energy inefficient gaseous fuel supply systems. A technical benefit may include an improved utilization of the gaseous fuel of the gaseous fuel supply system. That is, by transporting redundant gaseous fuel away from the fuel rail and/or the clean combustion engine in response to a reduced demand in injection pressure of the gaseous fuel to the clean combustion engine, the redundant gaseous fuel can be utilized elsewhere instead of e.g. being vented to the atmosphere. For example, the redundant gaseous fuel can be re-used in the gaseous fuel supply system. Moreover, by transporting redundant gaseous fuel away from the fuel rail and/or the clean combustion engine via the return line, a safer handling of the redundant gaseous fuel may be provided, compared to e.g. venting the redundant gaseous fuel to the atmosphere. It should be understood that the clean combustion engine is typically configured to receive gaseous fuel at a changeable demanded injection pressure being above a predetermined minimum required injection pressure and below a predetermined maximum required injection pressure. Thus, the control unit may be configured to control supply of redundant gaseous fuel in the return line from the fuel rail and/or the clean combustion engine in response to a reduction in the demanded injection pressure from a first demanded injection pressure to a second demanded injection pressure. Thus, the second demanded injection pressure is lower than, and subsequent to, the first demanded injection pressure.

Optionally in some examples, including in at least one preferred example, the gaseous fuel supply system comprises a storage tank for storing the redundant gaseous fuel from the return line. A technical benefit may include efficient storing of the redundant gaseous fuel. Thus, the return line may extend from the fuel rail and/or the clean combustion engine to the storage tank.

Optionally in some examples, including in at least one preferred example, the storage tank is comprised in the first gaseous fuel tank arrangement and the return line is arranged to supply the redundant gaseous fuel from the fuel rail and/or the clean combustion engine to the first gaseous fuel tank arrangement, or wherein the storage tank is a buffer tank and the return line is arranged to supply the redundant gaseous fuel from the fuel rail and/or the clean combustion engine to the buffer tank, the buffer tank being configured to receive gaseous fuel from the first fuel tank arrangement and to temporarily buffer pressurized gaseous fuel prior to being supplied to the fuel rail. A technical benefit may include improved utilization of the redundant gaseous fuel. For example, the storage tank is the first gaseous fuel tank in the first gaseous fuel tank arrangement, or a second gashouse fuel tank in the first gaseous fuel tank arrangement. Hereby, the redundant gaseous fuel is returned to the first gaseous fuel tank arrangement and may be reused as supply to the clean combustion engine. In case the storage tank is the buffer tank configured to receive gaseous fuel from the first fuel tank arrangement and to temporarily buffer pressurized gaseous fuel prior to being supplied to the fuel rail, the redundant gaseous fuel need not to be returned to the first gaseous fuel tank arrangement, but may be supplied to the buffer tank being arranged in between the first gaseous fuel tank arrangement and the clean combustion engine. Hereby, the redundant gaseous fuel may be re-used in an efficient manner.

Optionally in some examples, including in at least one preferred example, the gaseous fuel supply system further comprises a compressor configured to increase the pressure of the gaseous fuel, wherein the control unit is further configured to: control transport of the redundant gaseous fuel in the return line to the compressor. A technical benefit may include improved utilization of the redundant gaseous fuel. Thus, the redundant gaseous fuel from the return line may be utilized, even at low gaseous pressures. The compressor may be arranged in the return line, or the return line may end into the compressor.

Optionally in some examples, including in at least one preferred example, the control unit is configured to control the compressor such that the redundant gaseous fuel from the return line is raised to above the pressure in the buffer tank for subsequent buffer of the compressed gaseous fuel in the buffer tank, or to above the pressure in the storage tank for subsequent storage of the compressed gaseous fuel in the storage tank. A technical benefit may include efficient handling of the redundant gaseous fuel. Thus, the redundant gaseous fuel may be pressurized and stored in the desired tank (buffer tank or storage tank) by controlling the compressor accordingly. Thus, the compressor may be arranged in the return line to the buffer tank or the storage tank.

Optionally in some examples, including in at least one preferred example, gaseous fuel supply system further comprises: a second supply line arranged to supply pressurized gaseous fuel from the first gaseous fuel tank arrangement to the fuel rail, the second supply line being at least partly different to the first supply line. A technical benefit may include an improved supply of pressurized gaseous fuel to the fuel rail and clean combustion engine.

Optionally in some examples, including in at least one preferred example, the compressor is arranged in the second supply line, and the buffer tank is arranged downstream of the compressor, wherein at least the compressor is arranged to bypass the first supply line. A technical benefit may include improved operation of the clean combustion engine as the gaseous fuel may be pressurized on demand to meet the demanded injection pressure of the clean combustion engine. The return line may at least partly overlap with the second supply line, at least between the compressor and the buffer tank. For example, both the buffer tank and the compressor are arranged in the second supply line to bypass the first supply line.

Optionally in some examples, including in at least one preferred example, the control unit is configured to: identify the reduced demand in injection pressure of the gaseous fuel to the clean combustion engine as an engine shut-down. A technical benefit may include efficient handling of the redundant gaseous fuel in response to an engine shut down. Thus, the control unit may control transport of redundant gaseous fuel from the fuel rail and/or the clean combustion engine in response to an engine shut-down. It should be understood that the control unit need not to first identify a reduced demand in injection pressure, but may identify an engine shut-down, or a signal indicative of an engine shut-down (e.g. a direct command from the ECU), first and interpret such engine shut-down as a reduced demand in injection pressure (i.e. as the engine is shut-down, or is about to shut-down, the demand in injection pressure is reduced, possibly to a zero demanded injection pressure or to a no demand of gaseous fuel at all). However, according to some examples, the engine shut-down is identified by a detected reduction in fuel flow rate demand to the clean combustion engine.

Optionally in some examples, including in at least one preferred example, the control unit is configured to: identify the reduced demand in injection pressure of the gaseous fuel to the clean combustion engine as a sudden reduction in demanded injection pressure. A technical benefit may include efficient handling of the redundant gaseous fuel in response to a sudden reduction in demanded injection pressure. Thus, such sudden reduction in demanded injection pressure is not associated with an engine shut-down, but may be the result of different operating conditions for the clean combustion engine. The sudden reduction in demanded injection pressure may e.g. be defined as a minimum predetermined pressure difference over a predetermined time interval. The sudden decrease may correspond to a minimum pressure rate, e.g. some value between 0.5 bar/s and 15 bar/s, such as e.g. a value between 1 bar/s and 10 bar/s or a value between 5 bar/s and 10 bar/s. The minimum predetermined pressure difference may be 1 bar and the predetermined time interval may be 5 s or 10 s. Alternatively, minimum predetermined pressure difference may correspond to a 5% or 10% decrease of the pressure over the predetermined time interval. In some examples, the control unit is additionally configured to depressurize the previously mentioned buffer tank in response to the sudden reduction in demanded injection pressure. For example, the gaseous fuel supply system may comprise a buffer return line, and the control unit may be configured to operate a controllable valve in the buffer return line to depressurize the buffer tank. The buffer return line may be arranged to supply the gaseous fuel from the buffer tank to the first gaseous fuel tank arrangement, or to a second gaseous fuel tank arrangement.

It should also be noted that the sudden decrease in demanded injection pressure need not to be identified as a minimum predetermined pressure difference over a predetermined time interval, but instead of another parameter correlating to such sudden decrease in demanded injection pressure, e.g. a sudden decrease in fuel flow rate to the clean combustion engine or a sudden decrease of engine torque, over the predetermined time interval. That is, the control unit may be configured to identify a sudden decrease in fuel flow rate or engine torque which corresponds to the above defined sudden decrease in demanded injection pressure, and in response to such identification, control transport of redundant gaseous fuel away from the fuel rail and/or the clean combustion engine via the return line. Such sudden decrease in the fuel flow rate may be defined by a minimum fuel flow rate decrease of e.g. 0.1 $g/s^2$, or a minimum predetermined flow rate difference of e.g. 0.1 g/s during the previously mentioned predetermined time interval (e.g. 5 s or 10 s). A sudden decrease in engine torque may be defined by a minimum torque decrease of e.g. 50 Nm over the previously mentioned predetermined time interval (e.g. 5 s or 10 s), or an decrease of power of e.g. 10 KW over the previously mentioned predetermined time interval (e.g. 5 s or 10 s).

Optionally in some examples, including in at least one preferred example, the gaseous fuel supply system further comprises a second gaseous fuel tank arrangement comprising at least a second gaseous fuel tank storing pressurized gaseous fuel, wherein the first supply line is further arranged to supply pressurized gaseous fuel from the second gaseous fuel tank arrangement to the fuel rail. A technical benefit may include improved supply of gaseous fuel to the clean combustion engine. Moreover, the operation of the gaseous fuel supply system may be improved, as the first and second gaseous fuel tank arrangements may be used for different purposes, and/or during different types of operations of the clean combustion engine.

Optionally in some examples, including in at least one preferred example, the return line is a first return line and the gaseous fuel supply system further comprises at least a second return line. For example, the first return line may be arranged to supply redundant gaseous fuel from the clean combustion engine to the compressor and possibly further to the buffer tank, while the second return line is arranged to supply redundant gaseous fuel from the fuel rail to the first or second gaseous fuel tank arrangement. As an alternative, the second return line (or a third return line) is arranged to supply redundant gaseous fuel from the clean combustion engine to the first or second gaseous fuel tank arrangement. Moreover, the first return line and the second return line may at least partly overlap, e.g. as the first return line may be arranged to supply redundant gaseous fuel from the clean combustion engine or the fuel rail to the first or second gaseous fuel tank arrangement via the compressor, while the second return line may be arranged to supply redundant gaseous fuel from the clean combustion engine or the fuel rail to the first or second gaseous fuel tank arrangement without passing the compressor. For example, the first return line may thus be defined to extend from the from the clean combustion engine or the fuel rail to the inlet of the compressor, or to the inlet of the buffer tank via the compressor. Correspondingly, the second return line may be defined to extend from the clean combustion engine or the fuel rail to the inlet of a storage tank in the first or second gaseous fuel tank arrangement, without passing the compressor.

Optionally in some examples, including in at least one preferred example, the first gaseous fuel tank arrangement comprises a plurality of first gaseous fuel tanks, and/or the second gaseous fuel tank arrangement comprises a plurality of second gaseous fuel tanks. A technical benefit may include increased flexibility of the first gaseous fuel tank arrangement and/or the second gaseous fuel tank arrangement. The pressure of the gaseous fuel in the first gaseous fuel tank arrangement may e.g. correspond to the mean pressure of the plurality of first gaseous fuel tanks in the first gaseous fuel tank arrangement (e.g. in case the plurality of the first gaseous fuel tanks are used simultaneously), or of the pressure in the currently used first gaseous fuel tank (e.g. in case the plurality of the first gaseous fuel tanks are used sequentially). Correspondingly, the pressure of the gaseous fuel in the second gaseous fuel tank arrangement may e.g. correspond to the mean pressure of the plurality of second gaseous fuel tanks in the second gaseous fuel tank arrangement (e.g. in case the plurality of the second gaseous fuel tanks are used simultaneously), or of the pressure in the currently used second gaseous fuel tank (e.g. in case the plurality of the second gaseous fuel tanks are used sequentially).

For example, the first gaseous fuel tank arrangement may be utilized for operating the clean combustion engine during a first time interval. That is, supply of pressurized gaseous fuel from the first gaseous fuel tank arrangement is prioritized. This may proceed until the pressure of the gaseous fuel in the first gaseous fuel tank arrangement reaches a low pressure threshold (for example 50 bar-100 bar). Hereby, the first gaseous fuel tank arrangement may be used to receive redundant gaseous fuel from the return line, possibly without the need of compressing the redundant gaseous fuel (as the pressure of the gaseous fuel in the first gaseous fuel tank arrangement is at, or below, the low pressure threshold). Moreover, the second gaseous fuel tank arrangement may be utilized for operating the clean combustion engine during a second time interval subsequent to, possibly directly subsequent to, the first time interval. That is, supply of pressurized gaseous fuel from the second gaseous fuel tank arrangement is used after the pressure of the gaseous fuel in first gaseous fuel tank arrangement has reached the low pressure threshold. The second gaseous fuel tank arrangement may be utilized as the primary source of pressurized gaseous fuel during the operation of the clean combustion engine.

Optionally in some examples, including in at least one preferred example, the gaseous fuel supply system further comprises a third gaseous fuel tank arrangement comprising at least a third gaseous fuel tank storing pressurized gaseous fuel, and a third supply line arranged to supply pressurized gaseous fuel from the third gaseous fuel tank arrangement to the buffer tank, the third supply line being different to the first and second supply lines. A technical benefit may include improved supply of gaseous fuel to the clean combustion engine. The pressure of the gaseous fuel in the third gaseous fuel tank arrangement may be kept high, e.g. above a high pressure threshold, in order to quickly pressurize the buffer tank during transient operation conditions of the clean combustion engine (e.g. in response to a sudden increase in demanded injection pressure to the clean combustion engine). The third supply line may be the same as the buffer return line (i.e. the same line may be used for supplying pressurized gaseous fuel from the third gaseous fuel tank arrangement to the buffer tank, as for supplying gaseous fuel from the buffer tank to the third gaseous fuel tank arrangement when depressurizing the buffer tank).

Optionally in some examples, including in at least one preferred example, the gaseous fuel supply system further comprises a plurality of valves arranged in at least one of the return lines and in at least one of supply lines, wherein the control unit is configured to control the valves to control the flow of gaseous fuel in the corresponding return and supply lines. A technical benefit may include efficient control of supply of gaseous fuel in the return and supply lines.

Optionally in some examples, including in at least one preferred example, the first and second supply lines at least partly overlap. A technical benefit may include efficient utilization of piping in the gaseous fuel supply system. Thus, the first and second supply lines may at least partly share a common piping.

Optionally in some examples, including in at least one preferred example, the return line(s) and supply line(s) are comprised in piping of the gaseous fuel supply system. A technical benefit may include efficient transportation of the gaseous fuel in the return and supply lines. As previously mentioned, the piping of the third supply line is different to the piping of the first and second supply lines, but may be fluidly connected via e.g. a fourth supply line.

Optionally in some examples, including in at least one preferred example, the buffer tank is configured to supply pressurized gaseous fuel to the fuel rail via the second supply line. A technical benefit may include that pressurized gaseous fuel can be supplied to the fuel rail and the clean combustion engine by the first supply line without passing the compressor and the buffer tank. That is, both the compressor and the buffer tank may be arranged to bypass the first supply line.

Optionally in some examples, including in at least one preferred example, the gaseous fuel supply system further comprises a heat exchanger arranged upstream or downstream of the compressor. A technical benefit may include an efficient way to control the temperature of the pressurized gaseous fuel. For example, the heat exchanger is arranged in between the compressor and the buffer tank, or downstream of the buffer tank. Moreover, more than one heat exchanger may be comprised in the gaseous fuel supply system, e.g. a first heat exchanger arranged upstream of the compressor, and a second heat exchanger arranged between the compressor and the buffer tank. Hereby, the temperature of the pressurized gaseous fuel can be controlled in an improved manner.

Optionally in some examples, including in at least one preferred example, the pressurized gaseous fuel is pressurized hydrogen. A technical benefit may include utilization of a fuel having a high energy density (approximately 120 MJ/kg). Moreover, by using hydrogen as the fuel for combustion in the clean combustion engine, $CO_2$, unburned hydrocarbons (CO) and other carbon-containing emissions can be kept low, or even be avoided.

Optionally in some examples, including in at least one preferred example, the fuel tank(s) of the first, second and/or third gaseous fuel tank arrangements is arranged to store the pressurized gaseous fuel at 700 bar or 800 bar. For example, such fuel tank(s) is arranged to keep the pressurized gaseous fuel at a maximum pressure of between 700 bar and 800 bar, e.g. to keep the pressurized gaseous fuel between 70 bar and 700 bar or 800 bar.

Optionally in some examples, including in at least one preferred example, the fuel tank(s) of the first, second and/or third gaseous fuel tank arrangements is mainly gaseous. For example, at least 70%, or at least 80%, or at least 90%, or at least 95% (based on volume) of the fuel in such fuel tank(s) is gaseous. Thus, the fuel tank(s) is arranged to store the fuel as pressurized gaseous fuel such that at least 70%, or at least 80%, or at least 90%, or at least 95% (based on volume) of the fuel in the fuel tank(s) is gaseous.

Optionally in some examples, including in at least one preferred example, the clean combustion engine is a hydrogen combustion engine, such as a hydrogen high pressure direct injection engine, wherein the gaseous fuel supply system is arranged to supply pressurized gaseous fuel to such hydrogen combustion engine.

According to a second aspect of the disclosure, a vehicle comprising the gaseous fuel supply system of the first aspect of the disclosure is provided. The second aspect of the disclosure may seek to solve the same problem as described for the first aspect of the disclosure. Thus, effects and features of the second aspect of the disclosure are largely analogous to those described above in connection with the first aspect of the disclosure.

Optionally in some examples, including in at least one preferred example, the vehicle further comprises the clean combustion engine being a hydrogen combustion engine or a hydrogen high pressure direct injection engine. For example, the minimum required injection pressure of the hydrogen high pressure direct injection engine is at least 80 bar. The clean combustion engine is configured to receive the pressurized gaseous fuel from the first and/or second supply lines for combustion inside the engine. As mentioned with regards to the first aspect, the gaseous fuel supply system comprise a fuel rail upstream of a fuel injector of the clean combustion engine, wherein the fuel rail is arranged to supply pressurized gaseous fuel by the first and/or second supply lines to the fuel injector(s).

The clean combustion engine is configured to receive gaseous fuel at a changeable demanded injection pressure being above a predetermined minimum required injection pressure and below a predetermined maximum required injection pressure. The control unit may e.g. be configured to control the pressure of the gaseous fuel supplied to the fuel rail, e.g. by means of an engine injection pressure regulator arranged upstream or on of the fuel rail.

Optionally in some examples, including in at least one preferred example, the minimum required injection pressure of the clean combustion engine is at least 80 bar.

According to third aspect of the disclosure, an engine system is provided. The engine system comprises the gaseous fuel supply system of the first aspect of the disclosure, and a clean combustion engine. The clean combustion engine may typically correspond to that already described with reference to the first aspect of the disclosure or the second aspect of the disclosure. The third aspect of the disclosure may seek to solve the same problem as described for the first and second aspects of the disclosure. Thus, effects and features of the third aspect of the disclosure are largely analogous to those described above in connection with the first and second aspects of the disclosure.

According to a fourth aspect of the disclosure, a method for recovery of redundant gaseous fuel from a gaseous fuel supply system of a clean combustion engine having a fuel injector, the gaseous fuel supply system comprises: a first gaseous fuel tank arrangement comprising at least a first gaseous fuel tank storing pressurized gaseous fuel; a fuel rail arranged to supply gaseous fuel to the fuel injector; a first supply line arranged to supply pressurized gaseous fuel from the first gaseous fuel tank arrangement to the fuel rail; at least one return line arranged to transport redundant gaseous fuel from at least one of the fuel rail and the clean combustion engine, is provided. The method comprises: in response to a reduced demand in injection pressure of the gaseous fuel to the clean combustion engine, transporting redundant gaseous fuel away from the fuel rail and/or the clean combustion engine via the return line. The fourth aspect of the disclosure may seek to solve the same problem as described for the first to third aspects of the disclosure. Thus, effects and features of the fourth aspect of the disclosure are largely analogous to those described above in connection with the first to third aspects of the disclosure, and are typically not repeated for the fourth aspect. By supplying, in response to a reduced demand in injection pressure of the gaseous fuel to the clean combustion engine, gaseous fuel from the fuel rail and/or the clean combustion engine via the return line, improved utilization of the gaseous fuel of the gaseous fuel supply system is achieved.

Optionally in some examples, including in at least one preferred example, the method further comprises: transporting the redundant gaseous fuel to a storage tank using the return line.

Optionally in some examples, including in at least one preferred example, the storage tank is comprised in the first gaseous fuel tank arrangement or the storage tank is a buffer tank configured to receive gaseous fuel from the first fuel tank arrangement and to temporarily buffer pressurized gaseous fuel prior to being supplied to the fuel rail.

Optionally in some examples, including in at least one preferred example, the method further comprises: transporting the redundant gaseous fuel to the compressor using the return line.

Optionally in some examples, including in at least one preferred example, the method further comprises: pressurizing the redundant gaseous fuel by the compressor to above the pressure in the buffer tank and subsequently transporting the pressurized redundant gaseous fuel to the buffer tank, or pressurizing the redundant gaseous fuel by the compressor to above the pressure in the storage tank and subsequently transporting the pressurized redundant gaseous fuel to the storage tank.

Optionally in some examples, including in at least one preferred example, the method further comprises: identifying an engine shut-down action, the identified engine shut-down action being indicative of the reduced demand in injection pressure, or identifying a sudden reduction in the demanded injection pressure.

Applicable to the first to fourth aspects of the disclosure, the clean combustion engine may be configured to combust the gaseous fuel, e.g. hydrogen or a hydrogen-based fuel, producing water as by-product in the exhausts, wherein the gaseous fuel supply system is arranged to supply such gaseous fuel to the clean combustion engine. The clean combustion engine is typically configured to compress the gaseous fuel, e.g. hydrogen or a hydrogen-based fuel, together with air whereafter the fuel-air mixture is ignited (by a spark-plug or injection of another fuel, e.g. diesel). Alternatively, the clean combustion engine may be configured to compress only air, wherein the gaseous fuel is injected at the end of the compression stroke of the engine to either auto-ignite (by compression ignition) or be ignited by a spark-plug or injection of another fuel (e.g. diesel). The clean combustion engine may thus be an internal combustion engine.

It should be understood that the gaseous fuel of the gaseous fuel supply system may be hydrogen or a hydrogen-based fuel. As an alternative, the gaseous fuel of the gaseous fuel supply system is at least one of the following: natural gas, biogas, syngas, methane, propane and butane.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

DETAILED DESCRIPTION

The detailed description set forth below provides information and examples of the disclosed technology with sufficient detail to enable those skilled in the art to practice the disclosure.

The disclosed technology may solve the problem relating to energy inefficient gaseous fuel supply systems. The disclosed technology uses one or more return lines for transporting redundant gaseous fuel away from the fuel rail and/or the clean combustion engine in response to a reduced demand in injection pressure of the gaseous fuel to the clean combustion engine. Hereby, the redundant gaseous fuel can be utilized elsewhere instead of e.g. being vented to the atmosphere. For example, the redundant gaseous fuel can be re-used in the gaseous fuel supply system. A technical benefit may include an improved utilization of the gaseous fuel of the gaseous fuel supply system. Moreover, by transporting redundant gaseous fuel away from the fuel rail and/or the clean combustion engine via at least one return line, a safer handling of the redundant gaseous fuel may be provided, compared to e.g. venting the redundant gaseous fuel to the atmosphere. Hereby, an improved operation of the clean combustion engine may be provided.

Figure 1:
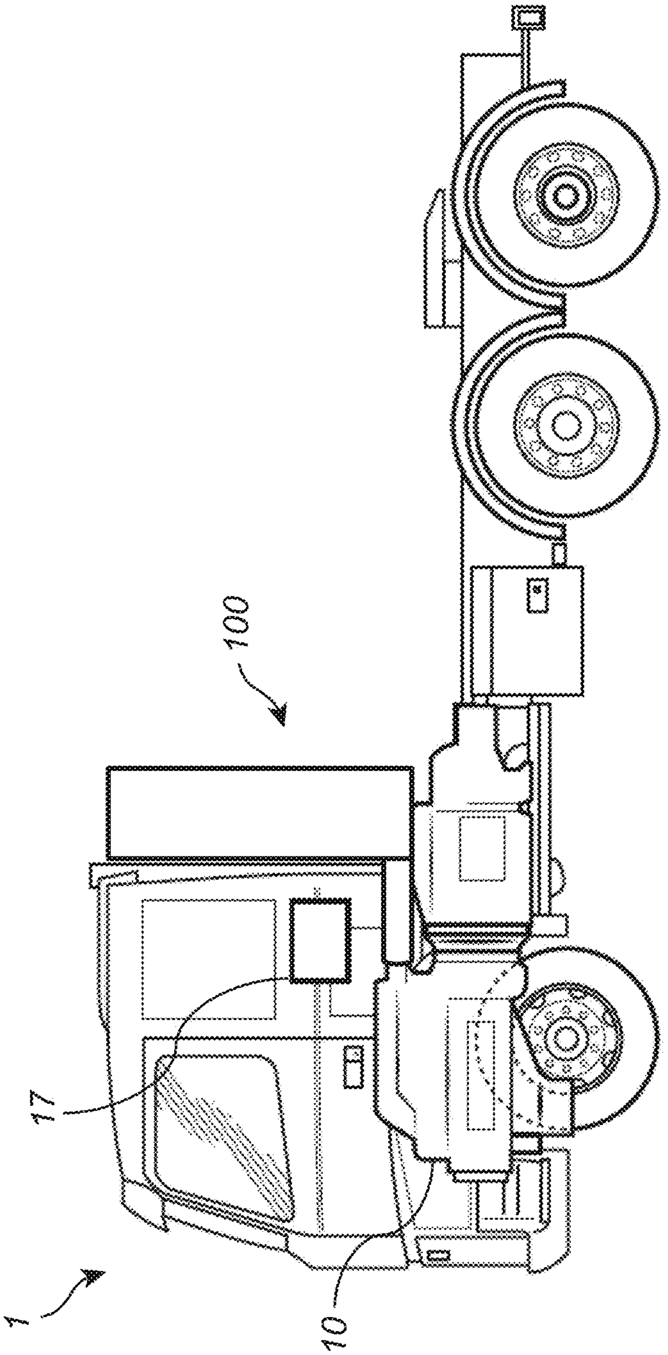
FIG. 1 is an exemplary, partly schematic, side view of vehicle comprising an internal combustion engine and a gaseous fuel supply system arranged to supply gaseous fuel to the internal combustion engine according to one example.

FIG. 1 shows a vehicle 1 in the form of an exemplary heavy duty truck. The vehicle 1 illustrated in FIG. 1 comprises an internal combustion engine 10 for propelling the vehicle 1, wherein the internal combustion engine 10 is a clean combustion engine. The clean combustion engine 10 is configured to combust a pressurized gaseous fuel producing water as by-product in the exhausts. The clean combustion engine 10 may e.g. be a hydrogen combustion engine, such as a hydrogen high pressure direct injection engine. However, the vehicle may be a hybrid, comprising at least one electric machine or electric traction machine powered by an energy storage system (not shown) to provide additional propulsion power to the vehicle 1. The clean combustion engine 10 is powered by a gaseous fuel (e.g. hydrogen) supplied to the clean combustion engine by a gaseous fuel supply system 100.

The vehicle 1 comprises a control unit 17 configured to control at least some of the operation of the gaseous fuel supply system 100, such as e.g. the control of the gaseous fuel from a gaseous fuel tank to the clean combustion engine 10.

Figure 2:
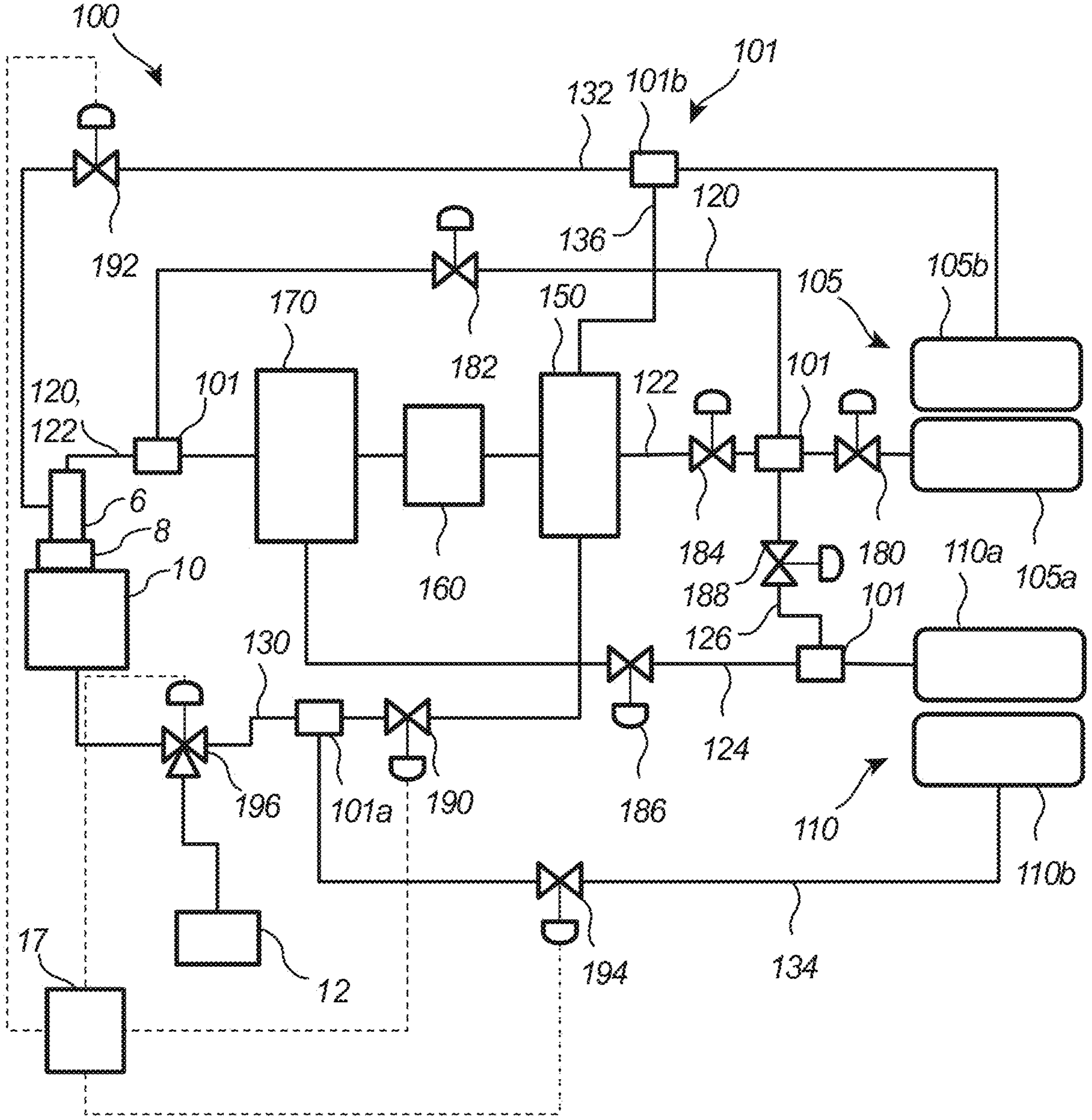
FIG. 2 is a schematic view of the gaseous fuel supply system of FIG. 1 according to one example.

In FIG. 2, the gaseous fuel supply system 100 of FIG. 1 is shown in more detail. The gaseous fuel supply system 100 comprises a first gaseous fuel tank arrangement 105 storing pressurized gaseous fuel, e.g. pressurized hydrogen, and a first supply line 120 arranged to supply pressurized gaseous fuel from the first gaseous fuel tank arrangement 105 to a fuel injector 8 of the clean combustion engine 10. In more detail, the gaseous fuel supply system 100 comprises a fuel rail 6 arranged to supply gaseous fuel to the fuel injector 8 of the clean combustion engine 10. In the example of FIG. 2, the first gaseous fuel tank arrangement 105 comprises a plurality of first gaseous fuel tanks 105*a*, 105*b* storing pressurized gaseous fuel, hence being first storage tanks 105*a*, 105*b*. Any one, or all, of the plurality of first gaseous fuel tanks 105*a*, 105*b* may be fluidly coupled to a first controllable supply valve 180 arranged in the first supply line 120 and configured to control the flow of pressurized gaseous fuel in the first supply line 120. The flow of pressurized gaseous fuel in the first supply line 120 may additionally be controlled by a second controllable supply valve 182.

The gaseous fuel supply system 100 further comprises a second supply line 122 arranged to supply pressurized gaseous fuel from the first gaseous fuel tank arrangement 105 to the fuel rail 6 upstream of the fuel injector 8 of the clean combustion engine 10. Thus, in addition to the first supply line 120, the second supply line 122 is arranged to supply pressurized gaseous fuel from the first gaseous fuel tank arrangement 105 to the fuel rail 6. Thus, the fuel rail 6 is configured to receive the pressurized gaseous fuel from the first and second supply lines 120, 122, and to supply pressurized gaseous fuel by to the fuel injector 8. The fuel injector 8 may obviously be one of a plurality of fuel injectors of the clean combustion engine 10.

The gaseous fuel supply system 100 further comprises a compressor 150 and a gaseous fuel buffer tank 170 arranged in the second supply line 122. The buffer tank 170 is arranged downstream of the compressor 150. In the example of FIG. 2, the compressor 150 and the buffer tank 170 are arranged to bypass the first supply line 120, and the buffer tank 170 is configured to supply pressurized gaseous fuel to the clean combustion engine 10 via the second supply line 120. As show in FIG. 2, the first supply line 120 and the second supply line 122 partly overlap, at least over the first controllable supply valve 180. Thus, the first controllable supply valve 180 is additionally configured to control the flow of pressurized gaseous fuel in the second supply line 122. The flow of pressurized gaseous fuel in the second supply line 122 may additionally be controlled by a third controllable supply valve 184.

The gaseous fuel supply system 100 may comprise a second gaseous fuel tank arrangement 110 storing pressurized gaseous fuel, e.g. pressurized hydrogen, and a third supply line 124 arranged to supply pressurized gaseous fuel from the second gaseous fuel tank arrangement 110 to the buffer tank 170. In the example of FIG. 2, the second gaseous fuel tank arrangement 110 comprises a plurality of second gaseous fuel tanks 110*a*, 110*b* storing pressurized gaseous fuel, hence being second storage tanks 110*a*, 110*b*. Any one, or all, of the plurality of second gaseous fuel tanks 110*a*, 110*b* may be fluidly coupled to a fourth controllable supply valve 186 arranged in the third supply line 124 and configured to control the flow of pressurized gaseous fuel in the third supply line 124. The third supply line 124 is different to the first and second supply lines 120, 122 in the sense that the third supply line 124 do not overlap with the first and second supply lines 120, 122. Thus, the buffer tank 170 may be reached by pressurized gaseous fuel from at least two different pathways, a first being the second supply line 122 via the compressor 150, and the second being the third supply line 124. The first, second and third supply lines 120, 122, 124 are typically comprised in piping of the gaseous fuel supply system 100.

As also shown in FIG. 2, the gaseous fuel supply system 100 may comprise a fourth supply line 126 arranged to supply pressurized gaseous fuel from the second gaseous fuel tank arrangement 110 to the first supply line 120 an/or to the second supply line 122, depending on the operation of the second and third controllable supply valves 182, 184. The flow of pressurized gaseous fuel in the fourth supply line 126 may be controlled by a fifth controllable supply valve 188. Thus, the flow of the of pressurized gaseous fuel in the fourth supply line 126 may be controlled by the fifth controllable valve 188. If not mentioned otherwise, the fifth controllable valve 188 is closed.

The control unit 17 is typically configured to control the operation of the first, second, third, fourth and fifth controllable supply valves 180, 182, 184, 186, 188. For example, the control unit 17 may be arranged to control the flow of the of pressurized gaseous fuel in the first, second and third supply lines 120, 122, 124 by controlling the first, second, third and fourth controllable supply valves 180, 182, 184, 186. That is, the control unit 17 may be configured to control supply of pressurized gaseous fuel from the first gaseous fuel tank arrangement 105 to the fuel rail 6 using the first supply line 120 by opening the first and second controllable supply valves 180, 182, and closing the third controllable supply valve 184. Moreover, the control unit 17 may be configured to control supply of pressurized gaseous fuel from the first gaseous fuel tank arrangement 105 to the fuel rail 6 using the second supply line 120 by opening the first and third controllable supply valves 180, 184, and closing the second controllable supply valve 182. Correspondingly, and independently of the flow of the of pressurized gaseous fuel in the first and second supply lines 120, 122, the control unit 17 may be configured to control supply of pressurized gaseous fuel from the second gaseous fuel tank arrangement 110 to the buffer tank 170 using the third supply line 120 by opening the fourth controllable supply valve 186, and/or be configured to control supply of pressurized gaseous fuel from the second gaseous fuel tank arrangement 110 to the first and second supply lines 120, 122 by opening the fifth controllable supply valve 188.

As shown in FIG. 2, the gaseous fuel supply system 100 comprises a plurality of return lines 130, 132, 134, 136 arranged to transport redundant gaseous fuel away from at least one of the fuel rail 6 and the clean combustion engine 10, instead of venting the redundant gaseous fuel to the atmosphere 12. Typically, the redundant gaseous fuel transported in one of the return lines 130, 132, 134, 136 is re-used in the gaseous fuel supply system 100. However, even though several return lines 130, 132, 134, 136 are described with reference to FIG. 2, it should be mentioned that only one, or a combination of some, of the return lines 130, 132, 134, 136 need to be present in the gaseous fuel supply system 100. The return lines 130, 132, 134, 136 are typically comprised in piping of the gaseous fuel supply system 100.

A first return line 130 is arranged between the clean combustion engine 10 and the compressor 150. Hereby, the redundant gaseous fuel from the first return line 130 may be utilized, even at low gaseous pressures, as the compressor 150 may be used to pressurize the redundant gaseous fuel to a desired pressure. The first return line 130 may further extend from the compressor 150 to the buffer tank 170. For this reason, the control unit 17 may be configured to control the compressor 150 such that the redundant gaseous fuel in/from the first return line 130 is raised to above the pressure in the buffer tank 170 for subsequent buffer of the compressed gaseous fuel in the buffer tank 170. Thus, the first return line 130 may end into the compressor 150, or the compressor 150 may be arranged in the first return line 130.

A second return line 132 is arranged between the fuel rail 6 and the first gaseous fuel tank arrangement 105, here a second one 105*b* of the first gaseous fuel tanks 105*a*, 105*b*. However, the second return line 132 may as well be arranged between the fuel rail 6 and the second gaseous fuel tank arrangement 110. Hereby, the redundant gaseous fuel from the second return line 132 may be utilized by storing of the redundant gaseous fuel in a storage tank 105*a*, 105*b*, 110*a*, 110*b* of the first or second fuel tank arrangements 105, 110.

A third return line 134 is arranged between the clean combustion engine 10 and the second gaseous fuel tank arrangement 110, here a second one 110*b* of the second gaseous fuel tanks 110*a*, 110*b*. However, the third return line 134 may as well be arranged between the clean combustion engine 10 and the first gaseous fuel tank arrangement 105. Hereby, the redundant gaseous fuel from the third return line 134 may be utilized by storing of the redundant gaseous fuel in the first or second fuel tank arrangements 105, 110. As seen in FIG. 2, the first return line 130 and the third return line 134 may overlap, at least from the clean combustion engine 10 to a first fluid connection point 101*a*.

A fourth return line 136 is arranged between the clean combustion engine 10 and the first gaseous fuel tank arrangement 105, here a second one 105*b* of the first gaseous fuel tanks 105*a*, 105*b*, via the compressor 150. For this reason, the control unit 17 may be configured to control the compressor 150 such that the redundant gaseous fuel in/from the fourth return line 136 is raised to above the pressure in first gaseous fuel tank arrangement 105 (e.g. above the pressure of the second storage tank 105*b*) for subsequent storing of the compressed gaseous fuel in the first gaseous fuel tank arrangement 105. As seen in FIG. 2, the fourth return line 136 and the first return line 134 may overlap, at least from the clean combustion engine 10 to the compressor 150, and the fourth return line 136 and the second return line 132 may overlap, at least from a second fluid connection point 101*b* to the first gaseous fuel tank arrangement 105.

Moreover, the third supply line 124 may be used as a buffer return line, and the control unit 17 may be configured to operate the fourth controllable valve 186 to depressurize the buffer tank 170. The buffer return line may thus be arranged to supply the gaseous fuel from the buffer tank 170 to the second gaseous fuel tank arrangement 110.

The flow of the redundant gaseous fuel in the return lines 130, 132, 134, 136 is typically controlled by controllable return valves 190, 192, 194, 196. For example, the flow of redundant gaseous fuel in the first return line 130 is controlled by a first controllable return valve 190, the flow of redundant gaseous fuel in the second return line 132 is controlled by a second controllable return valve 192, flow of redundant gaseous fuel in the third return line 136 is controlled by a third controllable return valve 194. The flow of redundant gaseous fuel in the fourth return line 136 may be controlled from within the compressor 150, and/or by a separate controllable return valve (not shown). Moreover, a fourth controllable return valve 196 is arranged to control the flow of redundant gaseous fuel to the atmosphere 12 and/or to the first return line 130. The control unit 17 is typically configured to control the operation of the first, second, third and fourth controllable return valves 190, 192, 194, 196.

The control unit 17 is configured to, in response to a reduced demand in injection pressure of the gaseous fuel to the clean combustion engine 10, control transport of redundant gaseous fuel away from the fuel rail 6 and/or the clean combustion engine 10 via the first, second, third and/or fourth return lines 130, 132, 134, 136. The control unit 17 is thus configured to operate the first, second, third and fourth controllable return valves 190, 192, 194, 196 for controlling transport of redundant gaseous fuel in the first, second, third and fourth return lines 130, 132, 134, 136.

It should be understood that the clean combustion engine 10 is typically configured to receive gaseous fuel at a changeable demanded injection pressure being above a predetermined minimum required injection pressure and below a predetermined maximum required injection pressure. The minimum required injection pressure of the clean combustion engine 10 may e.g. be at least 80 bar. The changeable demanded injection pressure may e.g. be controlled by an engine injection pressure regulator (not shown) arranged upstream of or on the fuel rail. Depending on the pressure of the gaseous fuel tanks of the first and second gaseous fuel tank arrangements 105, 110, the control unit 17 may operate the controllable supply valves 180, 182, 184, 186, 188, and the compressor 150, to control supply of pressurized gaseous fuel to the fuel rail 6 and the clean combustion engine 10, and the buffer tank 170. The control unit 17 may be configured to receive, or determine, the pressure of the gaseous fuel in the first and second gaseous fuel tanks 105*a*, 105*b*, 110*a*, 110*b* of the first and second gaseous fuel tank arrangements 105, 110, e.g. by means of corresponding pressure sensors (not shown).

The control unit 17 may be configured to identify a reduced demand in injection pressure of the gaseous fuel to the clean combustion engine 10 as an engine shut-down, or to identify the reduced demand in injection pressure of the gaseous fuel to the clean combustion engine 10 as a sudden reduction in demanded injection pressure. Thus, both the engine shut-down, and the sudden reduction in demanded injection pressure, are examples of a reduced demand in injection pressure for the clean combustion engine 10. Thus, the control unit 17 may be configured to control supply of redundant gaseous fuel in at least one of the first, second, third and fourth return lines 130, 132, 134, 136 from the fuel rail 6 and/or the clean combustion engine 10 in response to a reduction in the demanded injection pressure from a first demanded injection pressure to a second demanded injection pressure of the clean combustion engine 10. The second demanded injection pressure may e.g. be zero (in case of an engine shut-down) or the result of the sudden reduction in demanded injection pressure. Thus, the second demanded injection pressure is lower than, and subsequent to, the first demanded injection pressure.

It should be mentioned that the controllable valves, i.e. the first, second, third, fourth and fifth controllable supply valves 180, 182, 184, 186, 188 and the first, second, third and fourth controllable return valves 190, 192, 194, 196 are controllable in the sense that the control unit 17 may control them. Any one of, such as e.g. all of, the controllable valves 180, 182, 184, 186, 188, 190, 192, 194, 196 may be simple on/off valves, or control valves which opens and closes gradually. Moreover, as shown in FIG. 2 and as already partly described, fluid connections 101, such as e.g. the first and second fluid connections 101*a*, 101*b*, are indicated by boxes intersecting some of the supply lines 120, 122, 124, 126 and some of the return lines 130, 132, 134, 136. The fluid connections 101 may be T-junctions or cross-junctions, possibly controlled by a valve. Hence, intersecting lines between the supply lines 120, 122, 124, 126 and/or the return lines 130, 132, 134, 136 not indicated by a fluid connection 101 in FIG. 2, are not fluidly connecting intersecting lines.

The gaseous fuel supply system 100 may additionally comprise one or more heat exchangers. In the example of FIG. 2, a first heat exchanger 160 is arranged downstream of the compressor 150, and upstream of the buffer tank 170, in order to heat the pressurized gaseous fuel prior to reaching the buffer tank 170. However, a heat exchanger may alternatively, or additionally be arranged upstream of the compressor 150.

Figure 3:
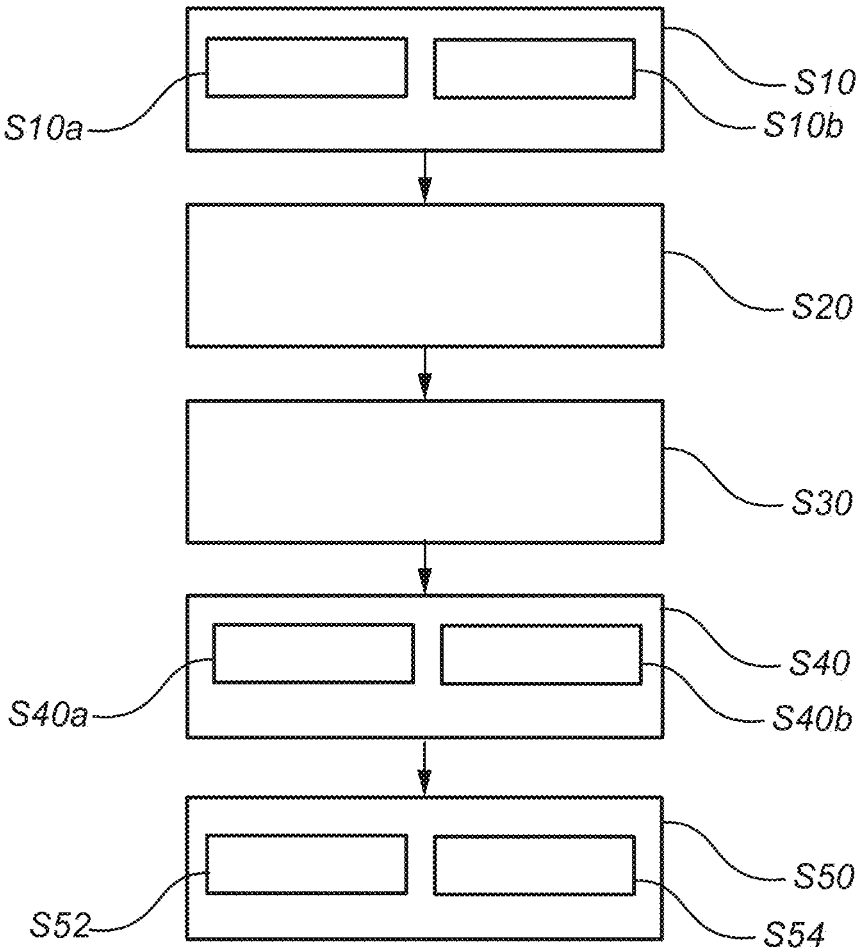
FIG. 3 is a flowchart is a flow chart of an exemplary method according to one example.

FIG. 3 is a flow chart of a method for recovery of redundant gaseous fuel from a gaseous fuel supply system of a clean combustion engine having a fuel injector. The gaseous fuel supply system and the clean combustion engine may be those described with reference to FIG. 2. Thus, reference is further made to features described in FIGS. 1-2, and the gaseous fuel supply system 100 typically comprises: a first gaseous fuel tank arrangement 105 comprising at least a first gaseous fuel tank 105*a*, 105*b* storing pressurized gaseous fuel; a fuel rail 6 arranged to supply gaseous fuel to the fuel injector 8; a first supply line 120 arranged to supply pressurized gaseous fuel from the first gaseous fuel tank arrangement 105 to the fuel rail 6; and at least one return line 130, 132, 134, 136 arranged to transport redundant gaseous fuel from at least one of the fuel rail 6 and the clean combustion engine 10.

In an optional first action or step, S10, a reduced demand in injection pressure of the gaseous fuel to the clean combustion engine 10 is identified. This may e.g. be identified as an engine shut-down action (S10*a*) being indicative of the reduced demand in injection pressure, or identified as a sudden reduction in the demanded injection pressure (S10*b*). This may e.g. be identified by the control unit 17.

In a second action or step, S20, redundant gaseous fuel is transported away from the fuel rail 6 and/or the clean combustion engine 10 via at least one return line 130, 132, 134, 136, in response to the identified reduced demand in injection pressure of the gaseous fuel to the clean combustion engine 10. Thus, the redundant gaseous fuel may be recovered and e.g. re-used in the gaseous fuel supply system 100. The redundant gaseous fuel may be transported away from the fuel rail 6 and/or the clean combustion engine 10 via one or more of the previously described first, second, third and fourth return lines 130, 132, 134, 136. This may e.g. be achieved by the control unit 17 controlling one or more of the previously described controllable return valves 190, 192, 194, 196.

For example, in a third action or step, S30, the redundant gaseous fuel is transported to the compressor 150 using the first return line 130. Hereby, the redundant gaseous fuel from the first return line 130 may be utilized, even at low gaseous pressures, as the compressor 150 may be used to pressurize the redundant gaseous fuel to a desired pressure.

For example, in a fourth action or step, S40, typically occurring subsequent to the third action or step S30, redundant gaseous fuel is pressurized in a first sub-action or sub-step S40*a* (to the fourth step S40) by the compressor 150 to above the pressure in the buffer tank 170 or is pressurized in a second sub-action or sub-step S40*b* (to the fourth step S40) by the compressor 150 to above the pressure in the first or second storage tank 105*a*, 105*b*, 110*a*, 110*b*.

Moreover, in a fifth action or step, S50, which e.g. may be performed instead of or in parallel to the third action or step S30 and/or the fourth action or step S40 (and corresponding sub-steps S40*a*, S40*b*), the redundant gaseous fuel is transported to a storage tank, such as one of the first storage tanks 105*a*, 105*b* or the second storage tanks 110*a*, 110*b* of the first and second gaseous fuel tank arrangements 105, 110, using the second or third return line 132, 134. For example, the redundant gaseous fuel is transported to a storage tank 105*a*, 105*b*, 110*a*, 110*b* without passing the compressor 150, when the gaseous fuel in the first gaseous fuel tank arrangement 105 has been depleted, or is at least below a low pressure threshold.

However, according to some examples, the fifth action or step S50 is carried out subsequently to the third and fourth actions or steps S30, S40 (and corresponding sub-steps S40*a*, S40*b*). For example, in a first sub-action or sub-step S52 to the fifth action or step S50, performed subsequently to the first sub-action or sub-step S40*a* to the fourth step S40, the pressurized redundant gaseous fuel is transported to the buffer tank 170 (the buffer tank 170 being an example of a storage tank). This may e.g. be achieved by controlling the flow of the redundant gaseous fuel in the first return line 130. In another example, in a second sub-action or sub-step S54 to the fifth action or step S50, performed subsequently to the second sub-action or sub-step S40*b* to the fourth step S40, the pressurized redundant gaseous fuel is transported to a storage tank, such as one of the first storage tanks 105*a*, 105*b* or the second storage tanks 110*a*, 110*b* of the first and second gaseous fuel tank arrangements 105, 110, using the fourth return line 136.

Example 1. A gaseous fuel supply system for a clean combustion engine having a fuel injector, the supply system comprising: a first gaseous fuel tank arrangement comprising at least a first gaseous fuel tank storing pressurized gaseous fuel; a fuel rail arranged to supply gaseous fuel to the fuel injector; a first supply line arranged to supply pressurized gaseous fuel from the first gaseous fuel tank arrangement to the fuel rail; at least one return line arranged to transport redundant gaseous fuel from at least one of the fuel rail and the clean combustion engine; and a control unit configured to: in response to a reduced demand in injection pressure of the gaseous fuel to the clean combustion engine, control transport of redundant gaseous fuel away from the fuel rail and/or the clean combustion engine via the return line.

Example 2. The gaseous fuel supply system of example 1, comprising a storage tank for storing the redundant gaseous fuel from the return line.

Example 3. The gaseous fuel supply system of example 2, wherein the storage tank is comprised in the first gaseous fuel tank arrangement and the return line is arranged to supply the redundant gaseous fuel from the fuel rail and/or the clean combustion engine to the first gaseous fuel tank arrangement, or wherein the storage tank is a buffer tank and the return line is arranged to supply the redundant gaseous fuel from the fuel rail and/or the clean combustion engine to the buffer tank, the buffer tank being configured to receive gaseous fuel from the first fuel tank arrangement and to temporarily buffer pressurized gaseous fuel prior to being supplied to the fuel rail.

Example 4. The gaseous fuel supply system of any of examples 1-3, further comprising a compressor configured to increase the pressure of the gaseous fuel, wherein the control unit is further configured to: control transport of the redundant gaseous fuel in the return line to the compressor.

Example 5. The gaseous fuel supply system of examples 3 and 4, wherein the control unit is configured to control the compressor such that the hydrogen from the return line is raised to above the pressure in the buffer tank for subsequent buffer of the compressed gaseous fuel in the buffer tank, or to above the pressure in the storage tank for subsequent storage of the compressed gaseous fuel in the storage tank.

Example 6. The gaseous fuel supply system of any of examples 1-5, further comprising: a second supply line arranged to supply pressurized gaseous fuel from the first gaseous fuel tank arrangement to the fuel rail, the second supply line being at least partly different to the first supply line.

Example 7. The gaseous fuel supply system of examples 5 and 6, wherein the compressor is arranged in the second supply line, and the buffer tank is arranged downstream of the compressor, wherein at least the compressor is arranged to bypass the first supply line.

Example 8. The gaseous fuel supply system of any of examples 1-7, wherein the control unit is configured to: identify the reduced demand in injection pressure of the gaseous fuel to the clean combustion engine as an engine shut-down.

Example 9. The gaseous fuel supply system of any of examples 1-8, wherein the control unit is configured to: identify the reduced demand in injection pressure of the gaseous fuel to the clean combustion engine as a sudden reduction in demanded injection pressure.

Example 10. The gaseous fuel supply system of any of examples 1-9, further comprising a second gaseous fuel tank arrangement comprising at least a second gaseous fuel tank storing pressurized gaseous fuel, wherein the first supply line is further arranged to supply pressurized gaseous fuel from the second gaseous fuel tank arrangement to the fuel rail.

Example 11. The gaseous fuel supply system of any of examples 1-10, wherein the pressurized gaseous fuel is pressurized hydrogen.

Example 12. A vehicle comprising the gaseous fuel supply system according to any of examples 1-11.

Example 13. The vehicle of example 12, further comprising a clean combustion engine being a hydrogen combustion engine or a hydrogen high pressure direct injection engine.

Example 14. The vehicle of any of examples 12-13, wherein the clean combustion engine is configured to operate with a minimum required injection pressure of at least 80 bar.

Example 15. A method for recovery of redundant gaseous fuel from a gaseous fuel supply system of a clean combustion engine having a fuel injector, the gaseous fuel supply system comprises: a first gaseous fuel tank arrangement comprising at least a first gaseous fuel tank storing pressurized gaseous fuel; a fuel rail arranged to supply gaseous fuel to the fuel injector; a first supply line arranged to supply pressurized gaseous fuel from the first gaseous fuel tank arrangement to the fuel rail; at least one return line arranged to transport redundant gaseous fuel from at least one of the fuel rail and the clean combustion engine, the method comprising: in response to a reduced demand in injection pressure of the gaseous fuel to the clean combustion engine, transporting redundant gaseous fuel away from the fuel rail and/or the clean combustion engine via the return line.

Example 16. The method of example 15, further comprising: transporting the redundant gaseous fuel to a storage tank using the return line.

Example 17. The method of example 16, wherein the storage tank is comprised in the first gaseous fuel tank arrangement or wherein the storage tank is a buffer tank configured to receive gaseous fuel from the first fuel tank arrangement and to temporarily buffer pressurized gaseous fuel prior to being supplied to the fuel rail.

Example 18. The method of any of examples 16-17, further comprising: transporting the redundant gaseous fuel to the compressor using the return line.

Example 19. The method of example 18, further comprising: pressurizing the redundant gaseous fuel by the compressor to above the pressure in the buffer tank and subsequently transporting the pressurized redundant gaseous fuel to the buffer tank, or pressurizing the redundant gaseous fuel by the compressor to above the pressure in the storage tank and subsequently transporting the pressurized redundant gaseous fuel to the storage tank.

Example 20. The method of any of examples 15-19, further comprising: identifying an engine shut-down action, the identified engine shut-down action being indicative of the reduced demand in injection pressure, or identifying a sudden reduction in the demanded injection pressure.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A gaseous fuel supply system for a clean combustion engine having a fuel injector, the supply system comprising:

a first gaseous fuel tank arrangement comprising at least a first gaseous fuel tank storing pressurized gaseous fuel between 70 bar and 800 bar, such that at least 70%, based on volume, of the fuel in the first gaseous fuel tank is gaseous;

a fuel rail arranged to supply gaseous fuel to the fuel injector;

a first supply line arranged to supply pressurized gaseous fuel from the first gaseous fuel tank arrangement to the fuel rail;

at least one return line arranged to transport redundant gaseous fuel from at least one of the fuel rail and the clean combustion engine;

a compressor configured to increase the pressure of the gaseous fuel; and a control unit configured to:

in response to a reduced demand in injection pressure of the gaseous fuel to the clean combustion engine, control transport of redundant gaseous fuel away from the fuel rail and the clean combustion engine via the return line to the compressor;

wherein the at least one return line is arranged to supply the redundant gaseous fuel from the fuel rail and the clean combustion engine to the first gaseous fuel tank in the first gaseous fuel tank arrangement, and wherein the control unit is further configured to control the compressor such that the redundant gaseous fuel from the return line is raised to above the pressure in the first gaseous fuel tank for subsequent storage of the compressed gaseous fuel.

2. The gaseous fuel supply system of claim 1, further comprising:

a second supply line arranged to supply pressurized gaseous fuel from the first gaseous fuel tank arrangement to the fuel rail, the second supply line being at least partly different to the first supply line.

3. The gaseous fuel supply system of claim 1:

wherein the compressor is arranged in the second supply line, and a buffer tank is arranged downstream of the compressor; and wherein at least the compressor is arranged to bypass the first supply line.

4. The gaseous fuel supply system of claim 1, wherein the control unit is further configured to:

identify the reduced demand in injection pressure of the gaseous fuel to the clean combustion engine as an engine shut-down.

5. The gaseous fuel supply system of claim 1, wherein the control unit is further configured to:

identify the reduced demand in injection pressure of the gaseous fuel to the clean combustion engine as a sudden reduction in demanded injection pressure.

6. The gaseous fuel supply system of claim 1, further comprising a second gaseous fuel tank arrangement comprising at least a second gaseous fuel tank storing pressurized gaseous fuel, wherein the first supply line is further arranged to supply pressurized gaseous fuel from the second gaseous fuel tank arrangement to the fuel rail.

7. The gaseous fuel supply system of claim 1, wherein the pressurized gaseous fuel is pressurized hydrogen.

8. A vehicle comprising the gaseous fuel supply system of claim 1.

9. The vehicle of claim 8, further comprising a clean combustion engine being a hydrogen combustion engine or a hydrogen high pressure direct injection engine.

10. The vehicle of claim 8, wherein the clean combustion engine is configured to operate with a minimum required injection pressure of at least 80 bar.

11. A method for recovery of redundant gaseous fuel from a gaseous fuel supply system of a clean combustion engine having a fuel injector, the gaseous fuel supply system comprising:

a first gaseous fuel tank arrangement comprising at least a first gaseous fuel tank storing pressurized gaseous fuel between 70 bar and 800 bar, such that at least 70%, based on volume, of the fuel in the first gaseous fuel tank is gaseous;

a fuel rail arranged to supply gaseous fuel to the fuel injector;

a first supply line arranged to supply pressurized gaseous fuel from the first gaseous fuel tank arrangement to the fuel rail;

at least one return line arranged to transport redundant gaseous fuel from at least one of the fuel rail and the clean combustion engine;

a compressor configured to increase the pressure of the gaseous fuel;

wherein the at least one return line is arranged to supply the redundant gaseous fuel from the fuel rail and the clean combustion engine to the first gaseous fuel tank in the first gaseous fuel tank arrangement;

the method comprising:

in response to a reduced demand in injection pressure of the gaseous fuel to the clean combustion engine, transporting redundant gaseous fuel away from the fuel rail and the clean combustion engine via the return line to the compressor, and pressurizing the redundant gaseous fuel by the compressor to above the pressure in the first gaseous fuel tank and subsequently transporting the pressurized redundant gaseous fuel to the first gaseous fuel tank.

12. The method of claim 11, further comprising:

identifying an engine shut-down action, the identified engine shut-down action being indicative of the reduced demand in injection pressure, or identifying a sudden reduction in the demanded injection pressure.

* * * * *